United States Patent [19]

Bhang

[11] Patent Number: 5,528,379
[45] Date of Patent: Jun. 18, 1996

[54] AUTOMATIC RADIO FREQUENCY SIGNAL LEVEL CONTROL APPARATUS FOR A VIDEO CASSETTE RECORDER

[75] Inventor: Joon W. Bhang, Seoul, Rep. of Korea

[73] Assignee: Goldstar Co., Ltd., Seoul, Rep. of Korea

[21] Appl. No.: 206,121

[22] Filed: Mar. 4, 1994

[30] Foreign Application Priority Data

Mar. 5, 1993 [KR] Rep. of Korea .................. 93-3321

[51] Int. Cl.⁶ ........................ H04N 5/76; G11B 5/02
[52] U.S. Cl. ................................. 358/335; 360/67
[58] Field of Search ........................ 358/315, 320, 358/327, 335, 337, 340; 360/10.3, 27, 31, 25, 33.1, 46, 61, 64, 67; 348/735, 645, 678, 707; H04N 5/76, 5/92, 5/95, 9/79, 9/89

[56] References Cited

U.S. PATENT DOCUMENTS

| | | | |
|---|---|---|---|
| 3,580,992 | 5/1971 | Eguchi | 178/6.6 HS |
| 3,947,871 | 3/1976 | Amari et al. | 358/8 |
| 4,030,125 | 6/1977 | Bedell et al. | 358/169 |
| 4,175,272 | 11/1979 | Numakura et al. | 360/34 |
| 4,184,173 | 1/1980 | Tamaru | 358/10 |
| 4,193,084 | 3/1980 | Yamagiwa et al. | 358/4 |
| 4,807,056 | 2/1989 | Sasaki et al. | 360/27 |
| 4,905,093 | 2/1990 | Satoh | 358/335 |
| 5,124,850 | 6/1992 | Kizu | 360/33.1 |
| 5,260,843 | 11/1993 | Ohtsuka | 360/64 |
| 5,291,342 | 3/1994 | Kim | 360/10.3 |

Primary Examiner—Tommy P. Chin
Assistant Examiner—Y. Lee
Attorney, Agent, or Firm—Christie, Parker & Hale

[57] ABSTRACT

Automatic RF signal level control apparatus for a VCR which can keep the RF channel signals recorded on or reproduced from a video tape in the same level by compensating for the level difference between the RF channel signals. The apparatus includes a detecting and comparing section for detecting and comparing the RF channel signal levels recorded or reproduced by channel heads, and converters and a switching section for compensating for the level difference between the RF channel signals according to the result of comparing.

3 Claims, 3 Drawing Sheets

FIG. 4
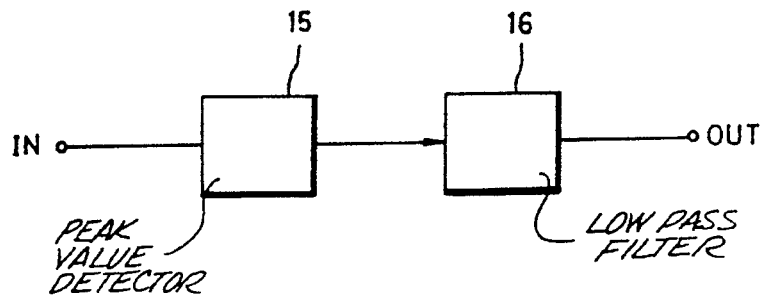
FIG. 5
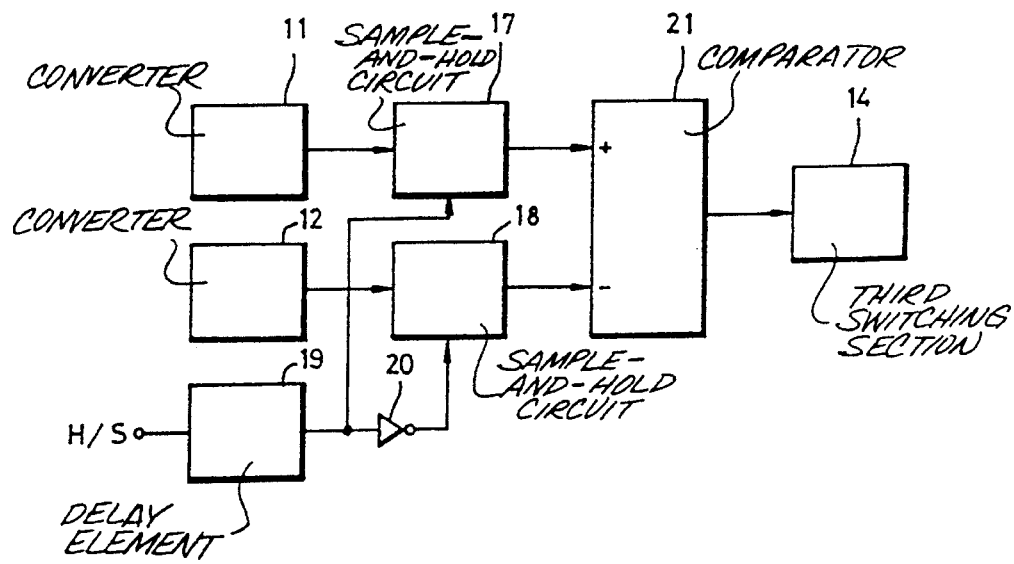
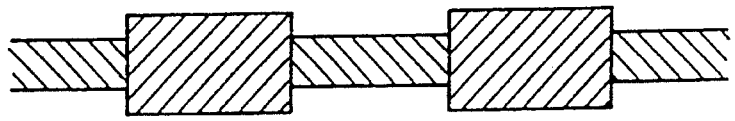
FIG. 6A
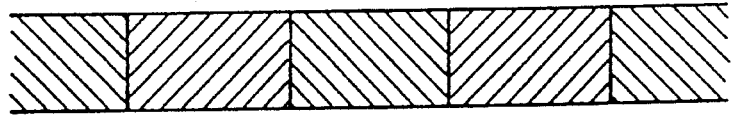
FIG. 6B
FIG. 6C

AUTOMATIC RADIO FREQUENCY SIGNAL LEVEL CONTROL APPARATUS FOR A VIDEO CASSETTE RECORDER

BACKGROUND OF THE INVENTION

1. Field of the Invention

The present invention relates to a radio frequency (RF) signal level control apparatus for a video cassette recorder (VCR), and more particularly to an automatic RF signal level control apparatus for a VCR which can keep the RF channel signals recorded on or reproduced from a video tape by channel heads in the same signal level by compensating for the level difference between the RF channel signals.

2. Description of the Prior Art

A conventional RF signal processing apparatus for a VCR is shown in FIG. 1. Referring to FIG. 1, the conventional apparatus includes pre-amplifiers 4,5 for amplifying RF channel signals reproduced from a video tape I by channel heads 2,3, respectively, a first switching section 6 for switching the RF channel signals amplified by the pre-amplifiers 4,5 in accordance with an input head switching signal H/S and outputting a switched RF signal, and an output amplifier 7 for amplifying the switched RF signal.

The conventional apparatus is also provided with an automatic gain control (AGC) level detector 8 for detecting an AGC signal level of the RF signal outputted from the output amplifier 7, a level generator 9 for generating a predetermined level signal level for AGC, and a second switching section 10 for selecting one of the output signals of the AGC level detector 8 and of the level generator 9 in accordance with an external input control signal CTL, and providing the selected signal to the output amplifier 7 as a gain control signal thereof.

The operation of the conventional apparatus constructed as described above will be explained with reference to FIG. 1 and FIGS. 2A to 2D.

The RF channel signals recorded on the video tape 1 are read out by the respective channel heads 2,3 and then amplified by the respective pre-amplifiers 4,5 to be inputted into the first switching section 6.

FIG. 2A represents one RF channel signal reproduced by the head 2 and FIG. 2B represents the other RF channel signal reproduced by the head 3.

The RF channel signals reproduced and inputted to the first switching section 6 as described above, are switched in conformity with the input timing of the respective RF channel signals according to the input head switching signal H/S as shown in FIG. 2C. As a result of the switching, the RF signal outputted from the first switching section 6 is shown in FIG. 2D. The switched RF signal is then amplified by the output amplifier 7 to be outputted through a terminal OUT for the following signal processing.

Meanwhile, the AGC level detector 8 detects the level of the output RF signal and the detected level signal is selectively fed back to the output amplifier 7 via the second switching section 10 as an AGC signal of the output amplifier 7, thereby stably controlling the gain of the output amplifier 7. That is, the second switching section 10 is switch-controlled according to the external control signal CTL and selects one of the output signals of the AGC level detector 8 and of the level generator 9. The selected signal is then fed back as the AGO signal of the output amplifier 7.

However, the problem in the above-described conventional RF signal processing apparatus has is that the RF signal finally reproduced and outputted has a level difference between the respective channels, as shown in FIG. 2D, in cases where the levels of the RF channel signals reproduced by the respective heads 2, 3 are different from each other, as shown in FIG. 2D, due to mechanical tolerance of the heads, recording error, electrical characteristics of the signal reproducing system, etc. Such problems may be also faced in recording the RF signal on the video tape. If the level difference between the channel signals occurs in any case, deteriorations of picture quality and of sound quality may also be generated.

SUMMARY OF THE INVENTION

It is an object of the present invention to provide an automatic RF signal level control apparatus for a VCR which can compensate for the level difference between RF channel signals recorded or reproduced by respective channel heads, thereby achieving the RF signal process with high picture quality and with high sound quality.

The automatic RF signal level control apparatus for a VCR according to the present invention comprises:

a plurality of pre-amplifying means for amplifying RF channel signals recorded or reproduced by a plurality of channel heads, respectively;

a plurality of conversion means for detecting the levels of said pre-amplified RF channel signals, and converting the detected level signals into gain control signals for said plurality of pre-amplifying means, respectively;

detecting and comparing means for detecting and comparing the levels of said gain control signals from said plurality of conversion means with each other and providing a switching control signal as information on a compensation-required channel according to the result of comparing; and switching means, switch-controlled according to said switching control signal from said detecting and comparing means, for selecting one of said gain control signals from said plurality of conversion means and feeding back the selected gain control signal to the corresponding pre-amplifying means so as to compensate for the output level of the corresponding preamplifying means.

BRIEF DESCRIPTION OF THE DRAWINGS

The above object and other features of the present invention will become more apparent by describing the preferred embodiment thereof with reference to the accompanying drawings, in which:

FIG. 4 is a circuit block diagram showing an embodiment of the converter in FIG. 3.

FIG. 5 is a circuit block diagram showing an embodiment of the detecting and comparing section in FIG. 3.

FIGS. 6A to 6C are waveform diagrams appearing at various points in the apparatus of FIG. 3.

DETAILED DESCRIPTION OF THE PREFERRED EMBODIMENT

Figure 3:
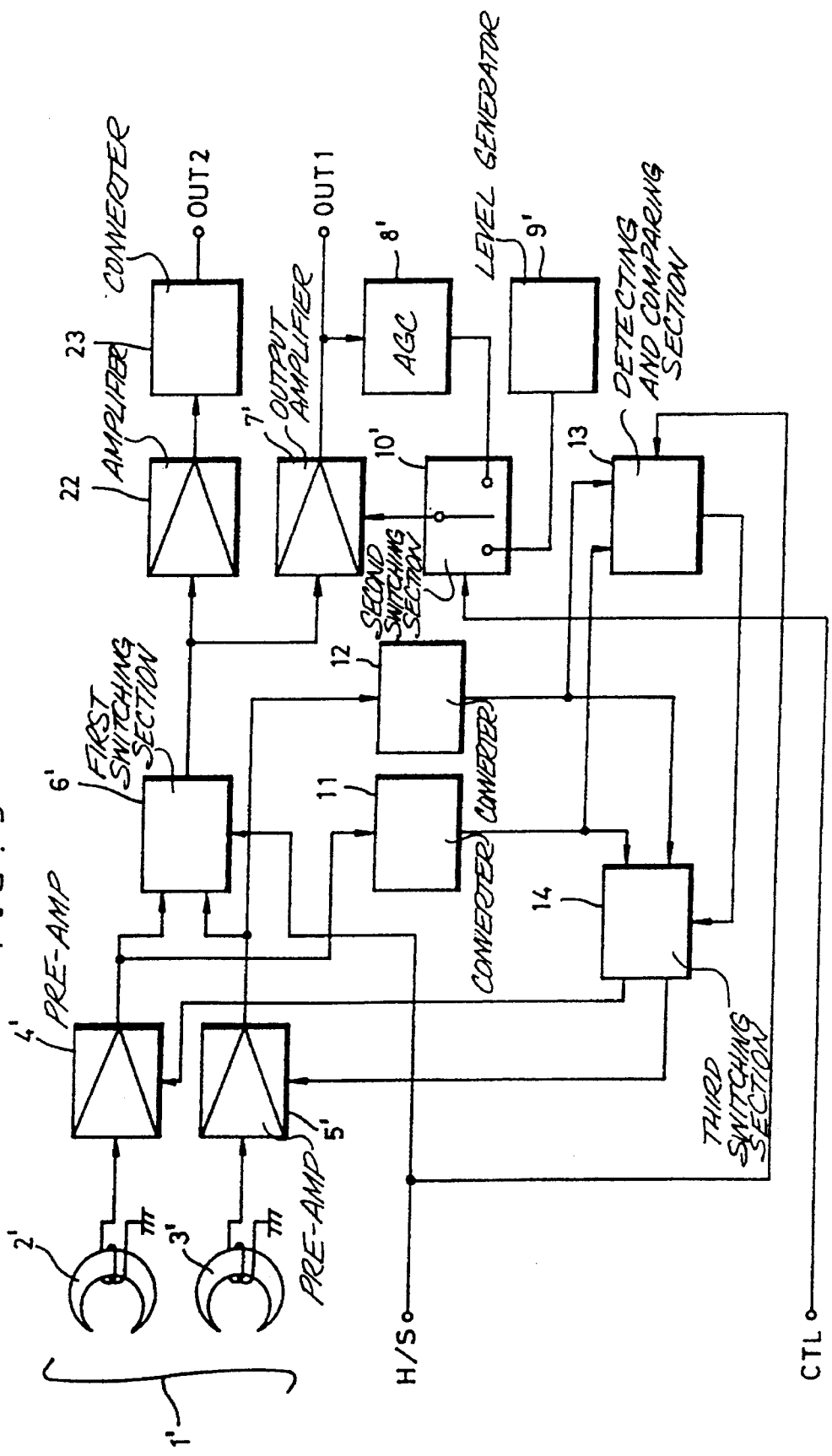
FIG. 3 is a circuit block diagram showing an embodiment of the RF signal level control apparatus according to the present invention.

FIG. 3 shows an embodiment of the automatic RF signal level control apparatus according to the present invention. Referring to FIG. 3, the apparatus of the present invention includes pro-amplifiers 4', 5' for amplifying RF channel signals reproduced from a video tape 1' by channel heads 2', 3', respectively, a first switching section 6' for switching and outputting the RF channel signals amplified by the pre-amplifiers 4',5' in accordance with an input head switching signal H/S, an output amplifier 7' for amplifying an RF signal outputted from the first switching section 6' and outputting the amplified RF signal through an output terminal OUT1, an AGO level detector 8' for detecting the AGO signal level of the RF signal outputted from the output amplifier 7' a level generator 9' for generating a predetermined level signal for AGC, and a second switching section 10' for selecting one of the output signals of the AGC level detector 8' and of the level generator 9' in accordance with an input control signal CTL and outputting the selected signal to the output amplifier 7' as a gain control signal thereof.

The apparatus of the present invention is also provided with converters 11, 12 for detecting the levels of the pre-amplified RF channel signals and converting the detected level signals into gain control signals for the pre-amplifiers, respectively, a detecting and comparing section 13 for detecting and comparing the output levels of the converters 11,12 with each other and providing a switching control signal as information on a compensation-required channel according to the result of comparing, and a third switching section 14, which is switch-controlled according to the output signal of the detecting and comparing section 13, for selecting one of the output signals of the converters 11, 12 and feeding back the selected output signal to the corresponding pre-amplifier between the pre-amplifiers 4',5' as its gain control signal so as to compensate for the output level of the corresponding pre-amplifier.

The apparatus of the present invention is further provided with an amplifier 22 for amplifying the output signal of the first switching section 6', and a converter 23 for converting the output signal of the amplifier 22 into a direct current (DC) signal for automatic tracking control.

Now, the operation of the apparatus according to the present invention as constructed above will be explained in detail with reference to FIGS. 3,4,5,6A to 6C.

The RF channel signals recorded on the video tape 1' are read out by the respective channel heads 2', 3' amplified by the respective pre-amplifiers 4', 5' and then inputted to the first switching section 6'.

Figure 1:
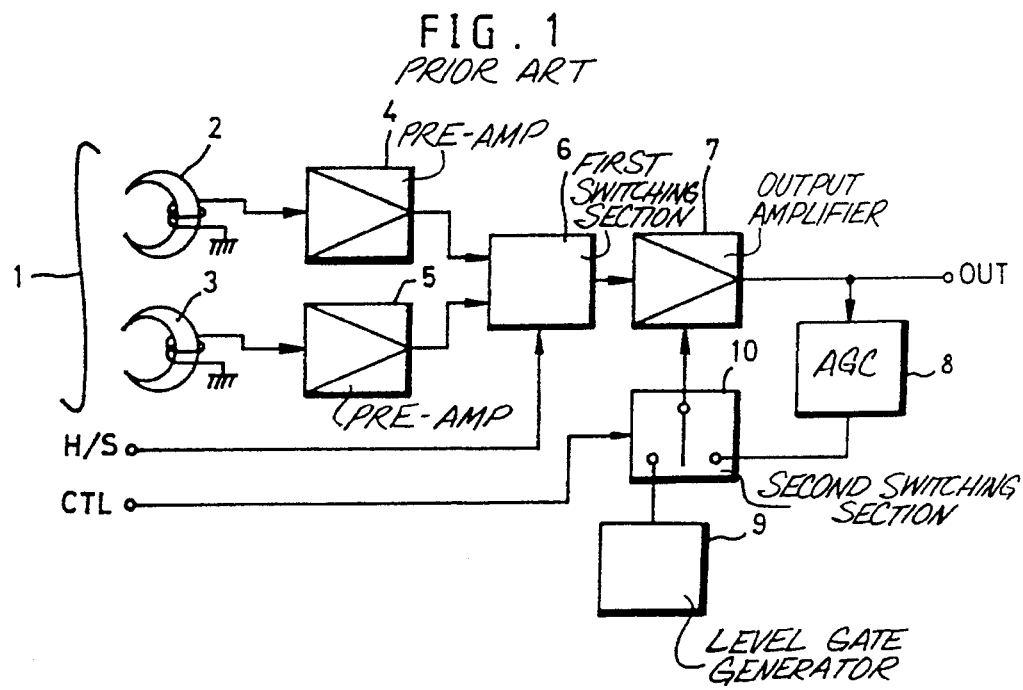
FIG. 1 is a circuit block diagram of the conventional RF signal processing apparatus for a VCR.
Figure 2:
FIGS. 2A to 2D are waveform diagrams appearing at various points in the apparatus of FIG. 1.
Figure 2:
Figure 2:
Figure 2:
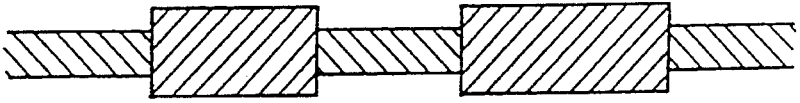

The respective RF channel signals inputted to the first switching section 6' are switched in conformity with the input timing of the respective RF channel signals by the first switching section 6' which is switch-controlled according to the input head switching signal H/S, as shown in FIG. 2C. As a result, the first switching section 6' outputs an RF signal[1] as shown in FIG. 2A. The outputted RF signal is amplified by the output amplifier 7' and the amplified RF signal is then outputted through the output terminal OUT1 and to the AGC level detector 8' for detecting the level of the outputted RF signal.

The detected level signal is selectively fed back to the output amplifier as the AGC signal thereof via the second switching section 10', thereby stably controlling the gain of the output amplifier 7'. That is, the second switching section 10' is switch-controlled according to the input control signal CTL and selects one of the output signals of the AGC level detector 8' and of the level generator 9'. The selected signal is then fed back to the output amplifier 7' as the AGC signal thereof.

Meanwhile, the respective RF channel signals outputted from the pre-amplifiers 4',5' are also inputted to the converter 11, 12, respectively. The converters 11, 12 detect the levels of the inputted RF channel signals, respectively, and outputting, as the gain control signals of the respective pre-amplifiers 4', 5' the signals corresponding to the detected levels to the detecting and comparing section 13 and to the third switching section 14 as well.

FIG. 4 shows an embodiment of the converters 11,12. In the embodiment, the converter is composed of a peak value detector 15 for detecting the peak value of the input signal thereof, and a low-pass filter 16 for converting the detected peak value into a DC signal.

According to the converter as constructed above, the peak value of the RF channel signal inputted from the pre-amplifier 4' or 5' is detected by the peak value detector 15, the detected peak value is filtered and converted into a DC signal through the low-pass filter 16, and the DC signal is then outputted to the detecting and comparing section 13 as an RF channel signal level detection signal. The detecting and comparing section 13 detects and compares the two RF channel levels inputted thereto and outputting to the third switching section 14 a switching control signal according to the comparison results.

FIG. 5 shows an embodiment of the detecting and comparing section 13. In the embodiment, the detecting and comparing section 13 comprises sample-and-hold circuits 17,18 for sampling and holding the RF channel level detection signal inputted from the converters 11, 12, a delay element 19 for delaying the head switching signal H/S for a predetermined time and providing the delayed signal to the sample-and-holder 17 as its control signal, an inverter 20 for inverting the delayed head switching signal and providing the inverted signal to the sample-and-holder 18 as its control signal, and a comparator 21 for comparing the output levels of the sample-and-holders 17, 18 and providing the switching control signal to the third switching section 14 as information on the compensation-required channel.

In the detecting and comparing section 13 as constructed above, the input head switching signal H/S is delayed for a predetermined time through the delay element 19 and then provided to the sample-and-hold circuit 17 so as to control the operation timing thereof.

Also, the head switching signal H/S delayed by the delay element 19 is inverted by the inverter 20 and the inverted signal is provided to the sample-and-hold circuit 18 so as to control the operation timing thereof. The sample-and-hold circuits 17, 18, the operation of which are controlled as mentioned above, sample and hold the resultant signals from RF channel level detection provided from the converters 11, 12, respectively, in conformity with the input timing of the respective RF channel signals. The held signals, i.e., the resultant signals from the RF channel level detection are then inputted to the comparator 21 so that the levels thereof are compared with each other. If the level difference between the input signals exists, the comparator 21 outputs a signal corresponding to the difference value.

For example, the output of the comparator 21 becomes 'high' if the signal level from the head 2' (i.e., the output level of the sample-and-hold circuit 17) is higher than the signal level from the head 3' (i.e., the output level of the sample-and-hold circuit 18), while the output of the comparator 21 becomes 'low' if the signal level from the head 2' is lower than the signal level from the head 3'.

As described above, the output signal of the detecting and comparing section 13 is inputted to the third switching section 14 as its switching control signal and accordingly, the third switching section 14 selects the output of the converter 11' or 12' which is required to be level-compensated and outputs the selected signal to the corresponding pre-amplifier 4' or 5' as its gain control signal.

Thus, the gain of the corresponding pro-amplifier, having received the gain control signal, is causing the respective RF channel levels outputted from the pre-amplifiers 4', 5' to coincide with each other FIG. 6B shows the reproduced RF signal obtained from the output of the first switching section 6', in which the respective switched RF channel levels coincide with each other.

That is, the operation of the third switching section 14 depends on the output of the comparator 21. As mentioned above, when the 'high' level output of the comparator 21 is inputted to the third switching section 1& as the switching control signal thereof, the third switching section 14 selects the output of the converter 12 as the gain control signal of the pro-amplifier 5'. At this time, the gain of the pre-amplifier 5' is increased as high as the value corresponding to the RF channel signal level which is reproduced through the head 3' and detected by the converter 12, and thereby the RF channel signal level reproduced by the head 3', being relatively low, is compensated for as high as the RF channel signal level reproduced by the other head 2'.

Meanwhile, when the RF channel signal level reproduced by the head 2' is relatively low, the output of the comparator 21 becomes 'low' and according to this low-level signal, the third switching section 14 selects the output of the converter 11, causing the gain of the pro-amplifier 5' to be increased. Consequently, in any case, the respective RF channel signal levels outputted from the first switching section 6' will coincide with each other as shown in FIG. 6B.

The RF signal from the first switching section 6' is then amplified by the output amplifier 7' to be outputted through the terminal OUT1. The RF signal is also amplified through the amplifier 22 and then converted into a DC level signal by the converter 23 to be outputted through the terminal OUT2 as an automatic tracking control signal.

In the embodiment as described above, automatic level control with respect to 2-channel RF signals reproduced by 2 heads is achieved, However, it will be obvious that the present apparatus may also be applied to automatic level control with respect to RF signals of more than 3 channels, for example, with respect to 4-channel RF signals reproduced by 4 head by adding the same circuit elements thereto. Further, the present invention may also be adapted in recording the respective RF channel signals on the video tape with keeping the levels of the RF channel signals to be recorded through the heads in a same level.

From the foregoing, it will be apparent that the present invention provides a novel RF signal level control apparatus which can keep the RF channel signals recorded on or reproduced from the video tape in the same level by comparing the levels of the respective RF channel signals to be recorded or reproduced, and by controlling the gain of the RF channel signal as high as the value corresponding to the level difference between the RF channel signals, so that the level of the respective RF channel signals to be recorded or reproduced coincide with each other. As a result, the present invention provides the advantages that signal detection error can be prevented and high operation reliability can be achieved in signal recording/reproduction in the image processing appliances such as VCRs, video cameras and so on.

While the present invention has been described and illustrated herein with reference to the preferred embodiment thereof, it will be understood by those skilled in the art that various changes in form and details may be made therein without departing from the spirit and scope of the invention.

What is claimed is:

1. An automatic radio frequency (RF) signal level control apparatus for a video cassette recorder comprising:

a plurality of pre-amplifying means each for amplifying RF channel signals from a video tape by a respective one of a plurality of channel heads;

a plurality of conversion means each for detecting the levels of said pre-amplified RF channel signals and converting the detected level signals into gain control signals for a respective one of said plurality of pre-amplifying means;

detecting and comparing means for detecting and comparing the levels of said gain control signals from said plurality of conversion means with each other and providing a switching control signal providing information as to one of said RF channel signals requiring compensation according to the result of such comparison; and switching means, switch-controlled according to said switching control signal from said detecting and comparing means for selecting one of said gain control signals from said plurality of conversion means and feeding back the selected gain control signal to the corresponding pre-amplifying means so as to compensate for the output level of the corresponding pre-amplifying means.

2. An automatic radio frequency (RF) signal level control apparatus as claimed in claim 1, wherein said conversion means comprises:

a peak value detector for detecting the peak value of the input signal thereof; and a low-pass filter for converting the detected peak value into a direct current signal.

3. An automatic radio frequency (RF) signal level control apparatus as claimed in claim 1, wherein said detecting and comparing means comprises:

first and second sample-and-hold circuits for sampling and holding RF channel level detection signals provided from said conversion means;

a delay element for delaying a received head switching signal for a predetermined time and providing the delayed head switching signal to said first sample-and-hold circuit as a control signal;

an inverter for inverting the delayed head switching signal and providing the inverted head switching signal to said second sample-and-hold circuit as a control signal; and a comparator for comparing the output levels of said first and second sample-and-hold circuits for providing said switching control signal to said switching means providing said information as to one of said RF channel signals requiring compensation.

* * * * *

UNITED STATES PATENT AND TRADEMARK OFFICE
CERTIFICATE OF CORRECTION

PATENT NO. : 5,528,379
DATED : June 18, 1996
INVENTOR(S) : Joon W. Bhang

It is certified that error appears in the above-indentified patent and that said Letters Patent is hereby corrected as shown below:

Column 1, line 19, change "tape I" to -- tape 1 --.
Column 1, line 30, before "signal" delete "level".
Column 1, line 65, change "AGO" to -- AGC --.
Column 1, line 67, after "apparatus" delete "has".
Column 3, line 14, change "AGO" to -- AGC -- (both occurrences).
Column 3, line 57, change "signal¹" to -- signal, --.
Column 4, lines 36,38, change "sample-and-holder" to -- sample-and-hold circuit -- (both occurrences).
Column 4, line 40, change "sample-and-holders" to -- sample-and-hold circuits --
Column 5, line 10, change "pro-amplifier" to -- pre-amplifier --.
Column 5, line 13, after "other" insert a period.
Column 5, line 20, change "1&" to -- 14 --.
Column 5, lines 23,34, change "pro-amplifier" to -- pre-amplifier --.
Column 5, line 47, after "achieved" replace the comma with a period.Column 5, line 51, change "head" to -- heads --.

Signed and Sealed this

Twenty-second Day of July, 1997

Attest:

BRUCE LEHMAN

Attesting Officer

Commissioner of Patents and Trademarks